Patented Jan. 14, 1941

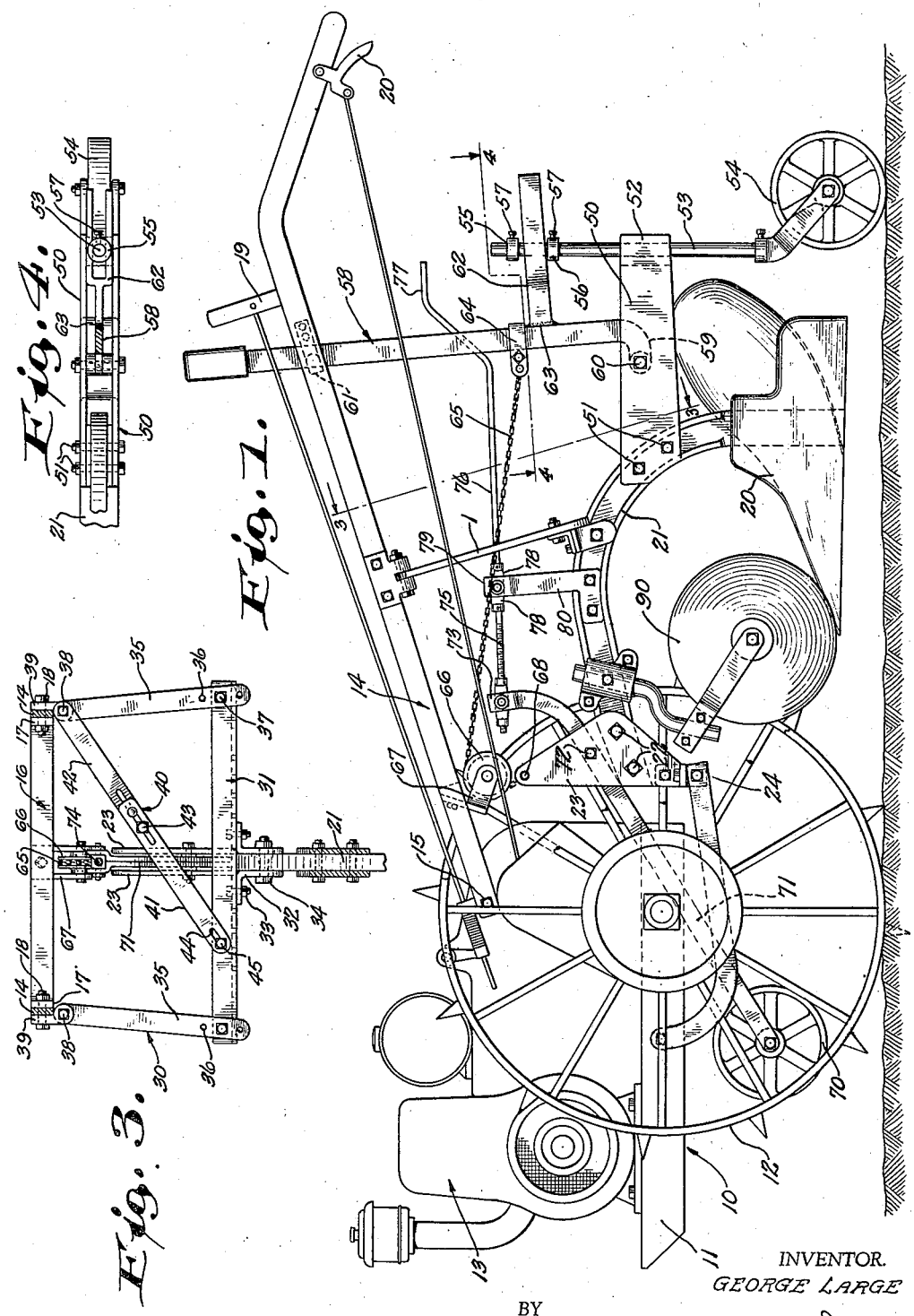

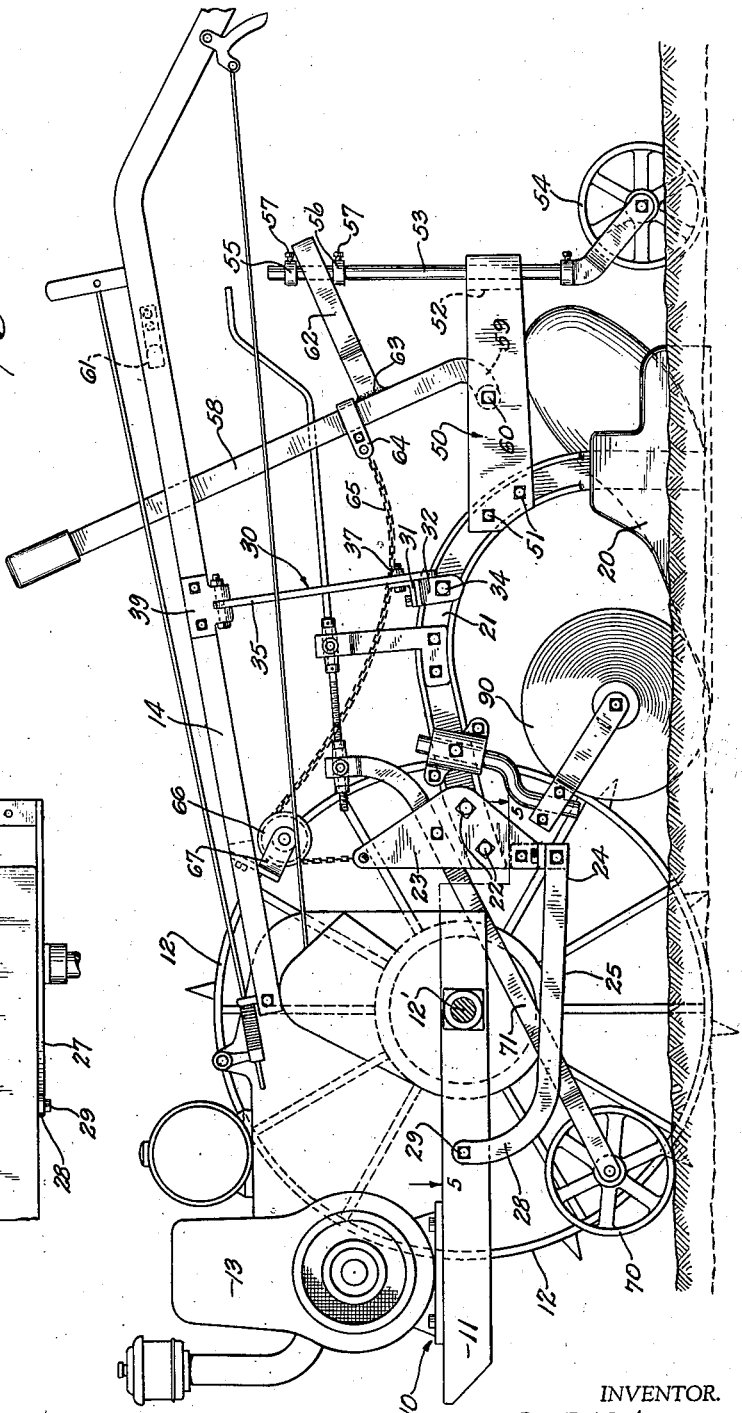

2,228,723

UNITED STATES PATENT OFFICE 2,228,723

PLOW

George Large, Port Washington, Wis., assignor to Harry W. Bolens, Port Washington, Wis.

Application May 11, 1939, Serial No. 273,020

11 Claims. (Cl. 97—48)

This invention relates to an improvement in motor or tractor driven plows of the type steered by a walking attendant.

One of the objects of the invention is to provide a plow of this character which is simple and durable in its construction, reliable and effective in operation, easily controlled and steered, and susceptible of convenient and economical manufacture.

Another object of the invention is to provide a plow having these advantages and capacities and wherein the plow when elevated is lifted point first so that it runs out of the ground and need not be pulled out. The same operation whereby the plow is lifted also depresses the rear caster wheel so that the plow, when elevated, is riding on all wheels and does not drag at times. Both actions are under the control of one hand lever which may be hooked in place for transport.

Another object of the invention is to provide a plow which is so combined and organized with the tractor that the reaction of the ground to the plow and the weight of the plow are both opposed to and counteract the torque reaction of the motor driven ground wheels.

Another object of the invention is to provide a plow where convenient control is had over the level or vertical position of the plow relative to the instrumentalities combined therewith.

A still further object is to provide a plow wherein the gage wheel which regulates the depth of plowing may be conveniently adjusted while the plow is in operation.

Another object of the invention is to so combine and interrelate the plow beam and the tractor frame and handles that after the opening furrows have been plowed the device may be so set that the tractor and plow are substantially self-steering.

A still further object is to provide means for adjustably supporting the plow to adapt the implement to the plowing of furrows of different widths.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 1 is a view in side elevation showing a plow constructed in accordance with the present invention and illustrating the plow proper lifted;

Figure 2 is a view similar to Figure 1 but showing the plow lowered and in plowing position;

Figure 3 is a fragmentary view in transverse section taken on line 3—3 of Figure 1;

Figure 4 is a view in horizontal section taken on line 4—4 of Figure 1; and

Figure 5 is a view in horizontal section taken on line 5—5 of Figure 2.

Referring to the drawings, it will be seen that the plow embodying the present invention includes a tractor designated generally at 10 and having a frame 11 and ground wheels 12 associated with an axle 12' and driven in any conventional manner from a motor such as an internal combustion engine 13.

Elongated and diverging handles 14 are provided and extend rearwardly from the tractor, the handles having their forward ends rigidly connected as at 15 to parts of the tractor which are rigidly interconnected with the frame thereof. The handles 14 are suitably cross braced. For example, as shown in Figure 3, a cross member 16 may be provided and has its angled ends 17 secured by bolts and nuts 18 to the handles 14. The usual control devices, of which two are shown at 19 and 19', are mounted on the handles 14.

The plow, designated at 20, is carried by a plow beam 21. A hitch is provided between the forward end of the plow beam and the tractor and for this purpose a pair of triangularly shaped plates 23 are rigidly secured by bolts 22 to the forward end of the beam 21. The lower corners of these plates 23 are adjustably and pivotally connected as at 24 to a cross member 25' extending transversely between the rearward ends of yoke arms 25 (see Figures 1, 2 and 5). The yoke arms 25 has upwardly curved ends 28 which are pivotally connected as at 29 to the tractor frame forwardly of the axle 12' on which the ground wheels 12 are mounted.

For the purpose of interconnecting the handles 14 and the beam of the plow and also leveling the plow and adjusting the width of the furrow, a frame designated generally at 30, is provided between the handles and the plow beam and is shown to advantage in Figure 3. The frame includes a horizontal frame member 31 extending transversely across the beam 21 and secured thereto by means of angle brackets 32, and bolts and nuts 33 and 34. The frame member 31 is provided with a plurality of spaced bolt holes to provide for transverse adjustment of the plow. This connection between the plow beam and the horizontal member 31 of the frame together with the transverse adjustment between the plow beam and the hitch makes it convenient to adjust the plow for plowing furrows of different widths. The ends of this frame member 31 are adjustably and pivotally connected to the lower ends of links 35. For this purpose each link 35 has a plurality of bolt holes 36 therein which may be selectively registered with corresponding bolt holes in the ends of the frame member 31. Bolts and nuts 37 coacting with registering bolt holes pivotally interconnect the ends of the links 35 with the frame member 31. The upper ends of the links 35 are pivotally interconnected as at 38 with bearing lugs 39 fastened with the handles 14 by the bolts and nuts 18. An adjustable and inclined brace member 40 completes the frame structure. It includes sections 41 and 42 having their adjacent ends slotted and overlapped and secured in adjusted position by means of bolts and nuts 43. By virtue of this structure, the length of the brace 40 may be varied. The upper end of the brace 40 is pivotally connected to one of the bolts 38 whereas the lower end has a lost motion connection with an intermediate portion of the frame member 31. This lost motion connection may be had by providing a slot 44 in the lower end of the section 41 of the brace and passing a bolt 45 through this slot and through a bolt hole in the frame member 31 and of course, holding the bolt in position by a suitable nut or nut and washer. The lost motion connection gives better control over steering or guiding, while the frame structure as a whole properly positions or levels the plow and operatively interconnects it with the handles.

The frame 30 provides means which renders the plow substantially self-steering after the first furrows have been plowed. In plowing the first furrows the bolt and nut 43 between the sections 41 and 42 of the brace is loosened. This facilitates the plowing of the first furrows since it makes it easier for the plowman to control the plow and maintain it along the line of plowing. After the furrows have been plowed the plowman throws or angles the plow and tractor toward the furrow wall slightly and then tightens up on the bolt and nuts 43. The wall of the furrow then relieves the plowman of the necessity of exerting any forceful effort in controlling the action of the plow insofar as steering is concerned.

A bracket 50 made up of a pair of bracket plates is rigidly bolted as at 51 to the plow beam and projects rearwardly therebeyond. The rear end of the bracket is provided with a vertical bearing 52 receiving the vertical spindle 53 of a rear caster wheel 54 which is carried by the lower end of the spindle. The spindle 53 is rotatably as well as axially shiftable with respect to its bearing 52. The upper end portion of the spindle 53 is equipped with two spaced collars 55 and 56 releasably and adjustably secured in position on the spindle by set screws 57. A hand lever 58 is provided and has its lower curved end 59 disposed between the bracket plates 50 and pivotally connected thereto as at 60. This lever 58 extends up between the handles 14 and in cooperative relation to a hook-like keeper 61. A fork 62 has one end 63 welded or otherwise rigidly fastened to the lower portion of the lever 58 and its bifurcated end straddles the upper end portion of the spindle 53 between the collars 55 and 56. Above the fork 62 a clip 64 is fastened to the lever 58 and provides for the connection to the lever of one end of a chain or similar flexible element 65. The chain 65 is reeved over a guide pulley 66 supported on a bracket 67 carried by the forward portions of the handles and is then extended down to and pivotally interconnected with the upper corner of the connector plates 23 as indicated at 68.

Figure 2 illustrates the position of the plow when plowing. If the attendant desires to lift the plow he grasps the upper end of the handle 58 and pulls rearwardly on it. The lever first rocks about its pivot 60 and its rearwardly projecting fork 62 presses down on the collar 56 and consequently on the caster wheel. When the caster wheel 54 firmly engages the ground, the point of engagement of the fork 62 with the collar 56 becomes the fulcrum of the lever 58. The chain 65 is first tightened and pulls upwardly on the connector plates 23 and consequently on the forward end of the plow beam 21 with the result that the plow is shifted from the position shown in Figure 2 to the position shown in Figure 1. As the point of the plow is lifted first, the plow runs out of the ground and hence is not pulled out solely by the manual force applied. As the action progresses, the lever exerts an upward pull on the plow at the pivotal connector 60 also. Furthermore, as the rear caster wheel is depressed, the plow when lifted rides on all three wheels and it may be readily latched in its elevated position by engaging the lever 58 with the hook-like keeper 61.

A gauge wheel 70 is provided to regulate the depth of the plowing and is carried on the forward end of a supporting arm or lever 71 passing between the connector plate 23 and pivotally interconnected therewith as at 72. The rearward end of the lever 71 is curved upwardly and provided with a yoke 73 in which a nut 74 is trunnioned or swiveled. A screw 75 is provided on the forward end of an elongated rod 76 which terminates at its rear end in the crank handle 77. The screw 75 is threadedly engaged with the nut 74. A smooth portion of the rod 75 which is rearwardly of the screw threads constituting the screw 75 is rotatably fitted in an opening extending through a swivel block 78 which has trunnions projecting radially therefrom to pivotally mount or swivel it in the bifurcated upper end 79 of a bracket 80 bolted to and extending upwardly from the plow beam 21. Collars 78' on the rod 76 coact with the block 78 to hold the rod against axial movement. By turning the crank handle 77 the screw 75 is rotated and as it is held against axial movement it coacts with the nut 74 to swing the lever arm 71 and hence raise or lower the gauge wheel. This adjustment may be readily effected while the plow is in operation. A suitable colter 70 may be provided.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A plow of the character described comprising a tractor including a frame and motor driven ground wheels, handles extending rearwardly from the frame and having their forward ends interconnected therewith, a plow disposed rearwardly of the frame and having a forwardly extending beam, a hitch between the plow and the frame including a yoke having its forward end pivotally interconnected with the frame and its rearward end pivotally interconnected with the beam, a bracket secured to the beam and extending rearwardly of the plow and provided with a bearing, a caster wheel having its spindle rotatably and slidably fitted in said bearing, a hand lever having its lower end pivotally interconnected with the bracket and having a rearwardly projecting fork straddling said spindle, a collar on said spindle below said fork, a flexible element having one end connected to the hand lever and having its other end connected to the forward end of the plow beam, a pulley on said handles overlying the forward end of the plow beam and about which said flexible element is reeved, and means interconnecting the plow beam and the handles for leveling the plow and rendering it responsive to steering movements of the handles.

2. A plow of the character described comprising a tractor, a plow disposed rearwardly of the tractor and having a forwardly extending beam, a hitch between the tractor and the forward end of the beam and including a pivot at the point of its connection with the beam, a caster wheel trailing the plow, a lift lever pivotally interconnected with the plow beam and having means adapted to fulcrum on and depress the caster wheel when the lever is swung in one direction, and motion transmission means between the lift lever and the forward end of the plow beam whereby when the lever is operated to depress the caster wheel the forward end of the plow beam and consequently the plow also will be lifted.

3. A plow of the character described comprising a tractor, handles extending rearwardly from the tractor and having their forward ends interconnected therewith, a plow disposed rearwardly of the tractor and having a forwardly extending plow beam, a hitch between the forward end of the plow beam and the tractor for permitting relative angular movement of the plow beam and the hitch, a frame interconnecting the plow beam and the handles, a caster wheel trailing the plow, a lift lever pivoted to the plow beam and having means adapted to fulcrum on and depress the caster wheel and supporting the plow thereon, and motion transmission means between the lift lever and the forward end of the plow beam whereby when the lift end is actuated to depress the caster wheel it will first pull the forward end of the plow beam upwardly.

4. A plow of the character described comprising a tractor, a plow disposed rearwardly of the tractor and having a forwardly extending plow beam, a hitch between the forward end of the plow beam and the tractor and including a flexible connection permitting of relative angular movement between the hitch and the plow beam, a caster wheel trailing the plow, a lift lever pivotally interconnected with the plow beam and having means adapted to fulcrum on and depress the caster wheel into engagement with the ground and then exert an upward lift on the plow, and motion transmission means between the hand lever and the forward end of the plow beam to exert an upward pull on the forward end of the plow beam when the hand lever is operated to depress the caster wheel whereby the plow comes out of the ground point first.

5. A plow of the character described comprising a tractor, a plow disposed rearwardly of the tractor and having a beam extending forwardly therefrom, a hitch between the plow beam and the tractor including connector plates fixed to the forward end of the plow beam, a yoke having its rearward end pivotally connected to the connector plates and its forward end pivotally connected to the tractor, a gauge wheel disposed forwardly of the plow, a supporting lever for the gauge wheel fulcrumed intermediate its ends on the connector plates and hand operated screw and nut means mounted on the plow beam and connected with said supporting lever for adjusting the position of said gauge wheel.

6. A plow of the character described comprising a tractor, handles extending rearwardly from the tractor having their forward ends connected thereto, a plow disposed rearwardly of the tractor and having a beam extending forwardly therefrom, a hitch between the plow and the tractor including a yoke having its rearward end pivoted to said beam and its forward end pivoted to the tractor, a frame interconnecting the plow beam and the handles, a caster wheel trailing the plow and having a spindle, a bracket secured to the plow beam and projecting rearwardly therefrom, a bearing carried by said bracket for the spindle of the caster wheel, and a lever pivoted to the bracket and having a fork straddling said spindle, a collar on the spindle with which the fork cooperates, a flexible element having one end connected to the hand lever and its other end connected to the forward end of said beam, and a pulley carried by the handles and overlying the forward end of said beam and about which said flexible element is trained.

7. A plow of the character described comprising a tractor, a plow disposed rearwardly of the tractor and having a beam extending forwardly therefrom, a hitch between the forward end of the beam and the tractor, a caster wheel trailing the plow, a hand lever pivotally connected to the plow beam and having means adapted to fulcrum it on the caster wheel, and motion transmission means between the hand lever and the forward end of the plow beam effective to exert an upward pull on the forward end of the plow beam when the hand lever is swung in one direction.

8. A plow comprising a tractor, a plow, handles interconnected with the tractor, a hitch between the plow and the tractor, means interconnecting the handles and the plow, a caster wheel trailing the plow, a lift lever pivotally interconnected with the plow and adapted to fulcrum on the caster wheel, and means interrelated with the hand lever, the handles and the forward end of the plow for exerting an upward pull on the forward end of the plow when the hand lever is swung in one direction.

9. A plow of the character described comprising a tractor, handles interconnected with the tractor and extending rearwardly therefrom, a plow disposed rearwardly of the tractor and having a forwardly extending plow beam, a hitch between the plow beam and the tractor, and a frame interconnecting the plow beam and the handles and including a transversely extending frame member fastened to the plow beam and overlying the handles, links pivotally interconnecting the ends of the transverse frame member and the handles, and an angled brace between one of the links and the transversely extending frame member and comprising a pair of sections having their outer ends connected to one of the links and to the frame member respectively and having their adjacent ends overlapped and releasably and adjustably interconnected.

10. A plow of the character described comprising a tractor, handles connected thereto and extending rearwardly therefrom, a plow disposed rearwardly of the tractor and having a forwardly extending plow beam, a hitch between the plow beam and the tractor, and a frame interconnecting the handles and the plow beam and having means to establish a rigid or flexible connection whereby to facilitate the establishment of the first furrows and thereafter render the plow substantially self-steering.

11. A plow of the character described comprising a tractor, handles connected to the tractor and extending rearwardly therefrom, a plow disposed rearwardly of the tractor and having a forwardly extending plow beam, a hitch between the forward end of the plow beam and the tractor and having means for transversely adjusting the plow, and a frame interconnecting the handles and the plow beam and having a transversely extending frame member, and means for adjustably interconnecting the transversely extending frame member and the plow beam whereby the plow may be adjusted for the plowing of furrows of different widths.

GEORGE LARGE.